Figure 10:
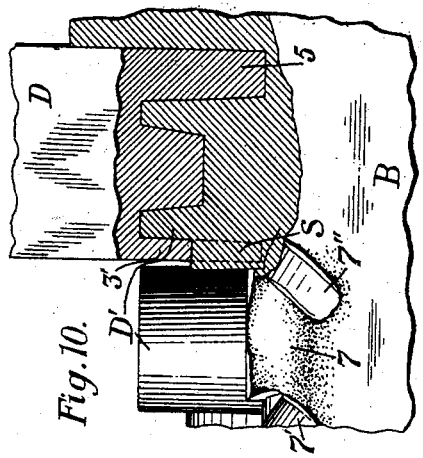

F. H. RICHARDS.
ART OF MAKING TYPES AND TYPE BARS.
APPLICATION FILED FEB. 12, 1907.
919,223.
Patented Apr. 20, 1909.
5 SHEETS—SHEET 1.
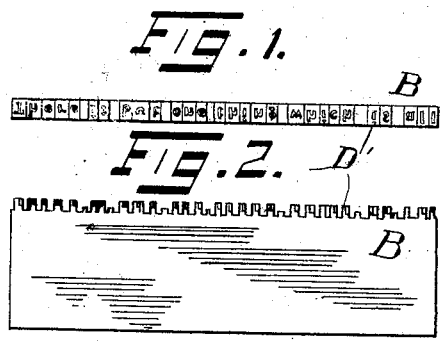
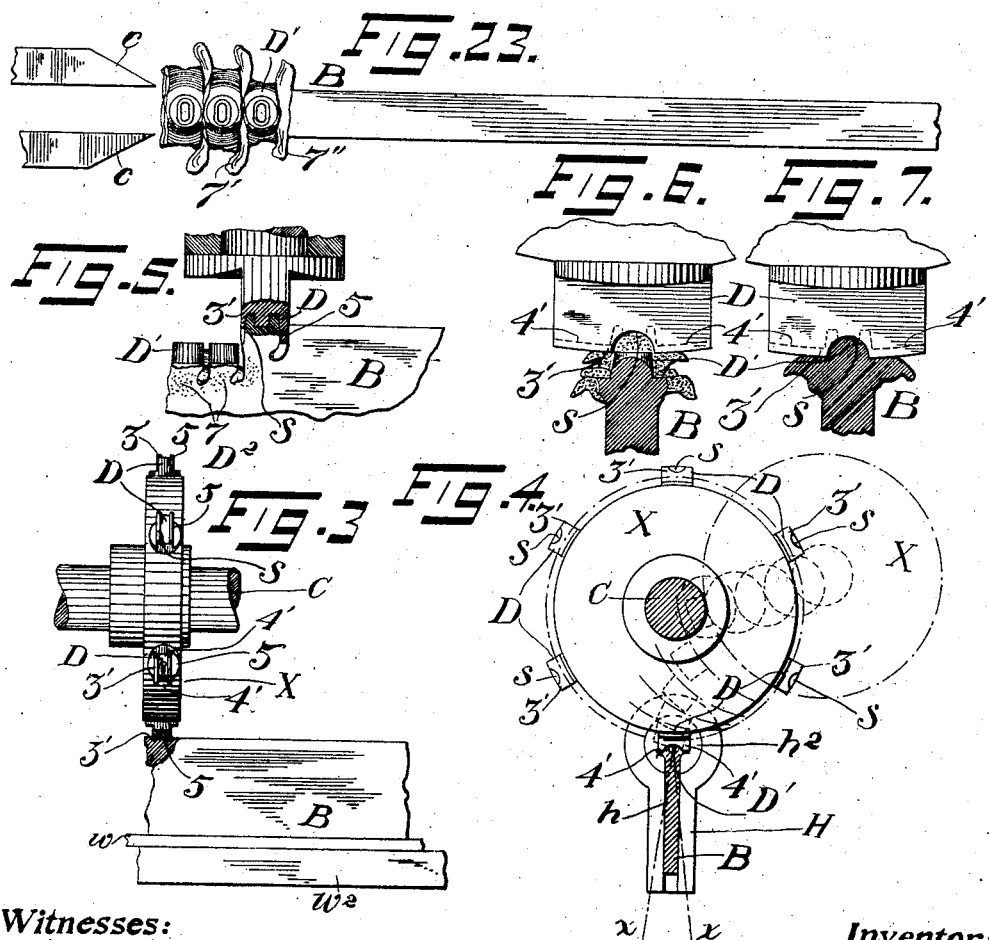
Witnesses:
F. J. Kohlberger
H. D. Penney
Inventor:
F. H. Richards F. H. RICHARDS.
ART OF MAKING TYPES AND TYPE BARS.
APPLICATION FILED FEB. 12, 1907.

919,223.

Patented Apr. 20, 1909.
5 SHEETS—SHEET 3.

Witnesses:
Harry Fleischer
H. D. Penney

Inventor:
F. H. Richards.

F. H. RICHARDS.
ART OF MAKING TYPES AND TYPE BARS.
APPLICATION FILED FEB. 12, 1907.

919,223.

Patented Apr. 20, 1909.
5 SHEETS—SHEET 4.

Witnesses:

Inventor:

F. H. RICHARDS.
ART OF MAKING TYPES AND TYPE BARS.
APPLICATION FILED FEB. 12, 1907.
919,223.
Patented Apr. 20, 1909.
5 SHEETS—SHEET 5.
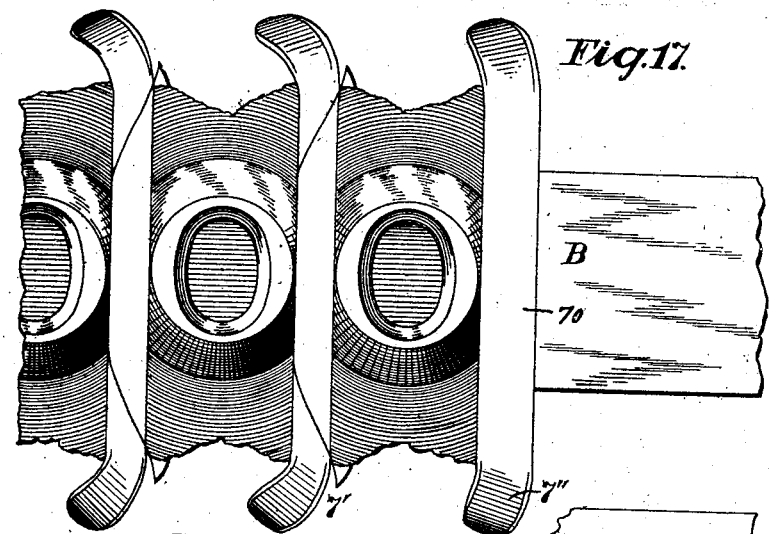
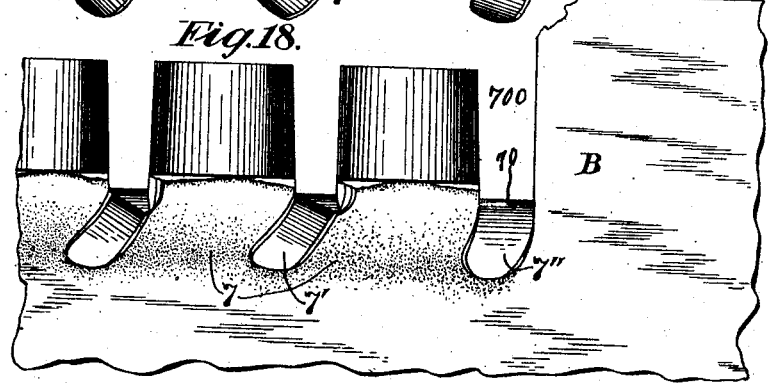
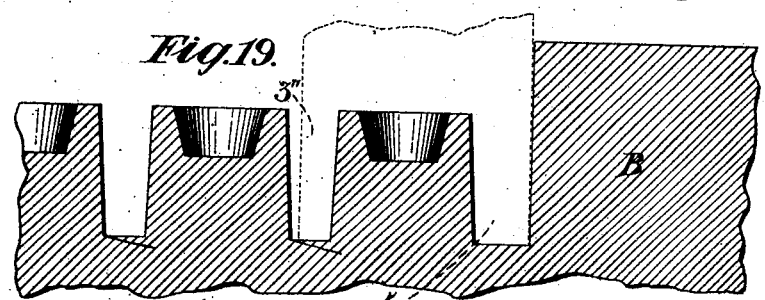
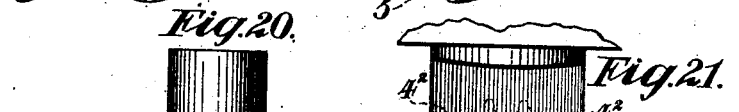

UNITED STATES PATENT OFFICE.

FRANCIS H. RICHARDS, OF HARTFORD, CONNECTICUT.

ART OF MAKING TYPES AND TYPE-BARS.

No. 919,223.   Specification of Letters Patent.   Patented April 20, 1909.

Application filed February 12, 1907. Serial No. 356,975.

*To all whom it may concern:*

Be it known that I, FRANCIS H. RICHARDS, a citizen of the United States, residing at Hartford, in the county of Hartford and State of Connecticut, have invented certain new and useful Improvements in the Art of Making Types and Type-Bars, of which the following is a specification, and which is the same as my allowed application Serial No. 212,952, filed June 17, 1904, so that this application is therefore a continuation thereof, and which said first application is a renewal of application Serial No. 57,934, filed April 29, 1901.

This invention relates to the art of making types and typebars in the cold, that is, from type-formable material in the solid condition as distinguished from a fluid state, attained by the application of heat other than that arising by virtue of or which may be generated by the operations to which the material is subjected and pertains more particularly to the manner in which flowage of material along a preformed path of least resistance is effected for permitting a prolongation of activity in the mass of material being acted upon; and to effecting the shifting of the types endwise of the blank during the cross rolling or working movement of the die relative to the blank, and pertains also to the forming of a longitudinal extension on each type and to the manner in which flowage of material longitudinally of the bar is effected for forming an integral extension of the type and permitting a prolongation of activity in the mass of material being acted upon, and to effecting flowage laterally for working surplus material outward along a predetermined path and forming a surface with which the material is brought into contact during the type forming operation.

Many efforts have been made to produce from a mass of type-formable material by the action of a die, a type suitable for use in and which would satisfactorily meet the requirements of the typographic art, in point especially of sharp definition and durability, and to combine a number of such types so formed into a line of composed types, or type faces, in the endeavor to produce a typebar that would satisfy the demands of the art for successful commercial application.

In carrying out my present invention I avoid the necessity of setting-off the type-blocks before the dies are brought into action, and I subject each type-formable portion of the blank to repeated actions, which for the purpose of producing symmetrically-formed types, are preferably alternated from side to side of the mass. These repeated actions result in the gradual reduction of the type-block to shape and are of such character that they operate to strengthen and finish the base portions of the block where the latter connects with the body of the blank and to condense and compact the impression and other faces of the type besides operating to satisfactorily fill the angular portions and hair-line spaces of the die cavity. The excess or surplus material is forced or caused to flow laterally or crosswise of the blank, that is, in a direction away from an adjacent type, and for the purpose of more effectually protecting this type from the action of the working die, I preferably utilize a retaining wall at the side of the die for the purpose of confining the material and controlling its direction of flow.

The less the magnitude of the formative stresses of the die during its operation upon the metal to form a type, the less manifestly will be the tendency to displace or distort adjacent finished types or surfaces. Moreover, it is clear that the flowage induced by the advancing die will naturally be along the line of least resistance. In this connection, also, is to be borne in mind the fact that some of the types used for forming the various characters of ordinary composition are more readily formed than others, that is, less work is performed by the dies in producing certain types than in producing others. In forming types, in other words, the material will need to be subjected to a less number of operations in some instances than others, depending upon the particular type which is to be produced, and if the type-forming operation is carried beyond the stage in which the material has assumed the condition of a finished type the tendency of the stresses induced by further action of the die is to mar or distort the type within the die cavity. The line also, of least resistance to flowage of metal in the die, may be, and almost invariably is, in a direction such that this movement results in the tipping or displacement of the adjacent type. That is to say, in an organized system of forming composed types along a typebar, in which the various elements or factors involved in the type-forming operation, for example, the amount of feed movement of the die and blank toward each other, the concurrent subsidiary motion, if there be such, the amount of surplus material to be removed by the die, etc., are not adapted to each individual type to be formed, the result is an unsatisfactory typebar and one ill-fitted to meet the demands of the art.

One of the principal features characterizing the present invention involves the inducement of flowage arising from the type-formative stresses of the die along a predetermined and preformed line or path of least resistance, which, by its presence, serves to protect the type adjacent to the working die, and by the facility which it offers for the movement of the material, permits the die to be operated beyond the final stage in which the material has assumed the condition of a finished type, without marring such type, whereby the steps in the various type-forming operations may be the same in amount and kind for the entire series of dies. In practice, moreover, it is found desirable under some circumstances, to have the types relatively high at those sides adjacent to the sides of the bar. One object of this is to permit the wax, papier mâché, or other material used in the electrotyping or stereotyping process to come down over the row of type a considerable distance so as to form a relatively deep channel between the successive rows or lines of type when the typebars are assembled. It is, however, objectionable, and especially so in this kind of work to have the types midway of the width of the bar as high as they are at the sides of the bar. In other words, it is found desirable in order to provide for perfect working, under various conditions, to have the spaces between the types of a relatively shallow depth midway of the bar and of relatively greater depth as they approach the sides of the latter. To this end provision exists in carrying out my present method for filling the space to the rearward of each type when this is made.

In the manufacture, according to the present invention, of the successive word-related types of a line of type or of a typebar, when each die is first applied to its proper portion of the blank, the area of the stock measured transverse to the axis of the die cavity and which enters the latter, is somewhat less than the corresponding area of the cavity at the mouth of the die. The space in the die thus empty initially, is ultimately filled as the working progresses; during this operation the stock is shifted backward in the direction of length of the bar or blank, the type-block finally formed overlapping the word-related type-block last made, where the latter integrally connects with the stock of the bar or blank.

Figure 9:
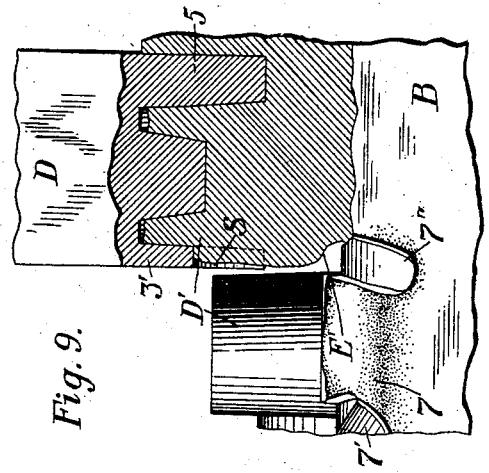
Figure 8:
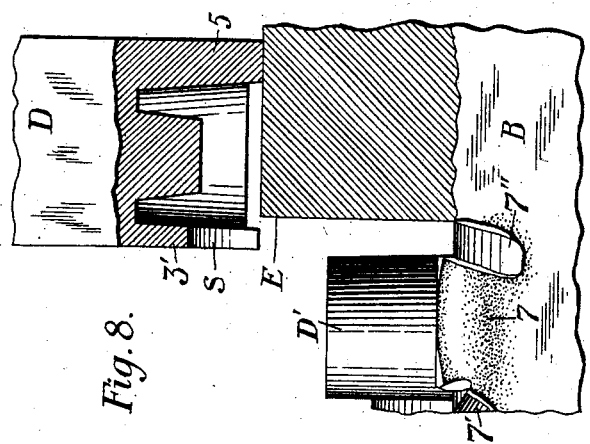
Figure 11:
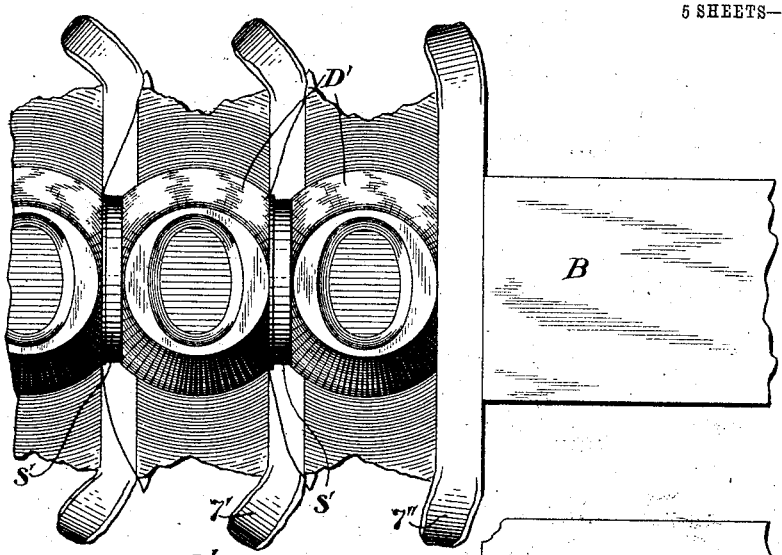
Figure 12:
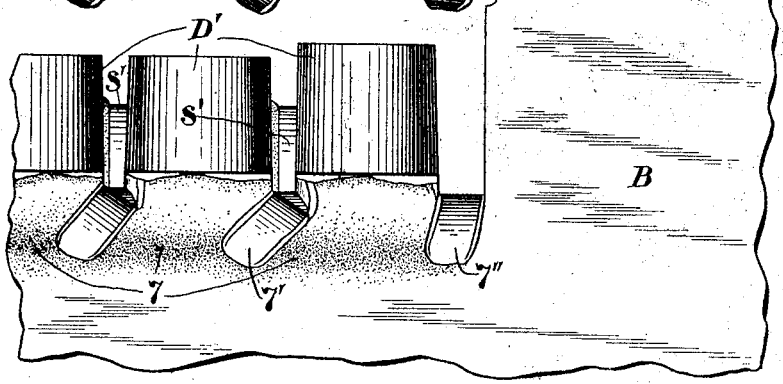
Figure 13:
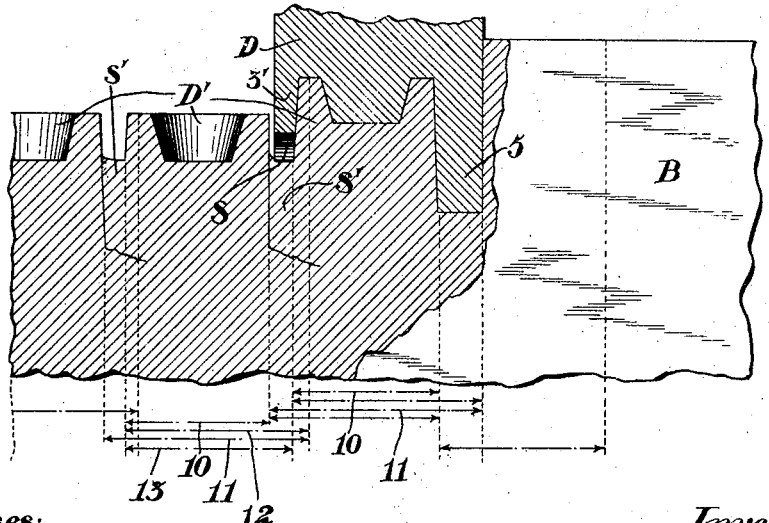
Figure 14:
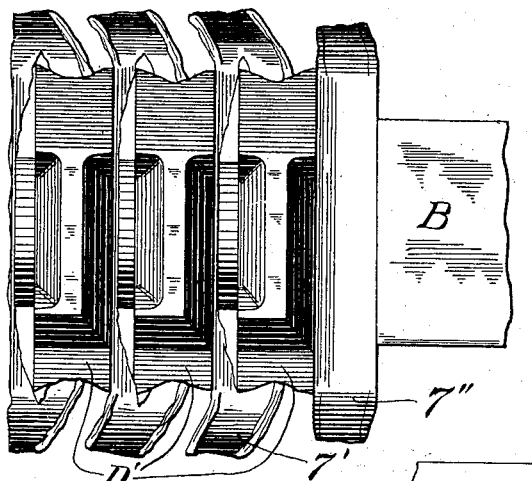
Figure 15:
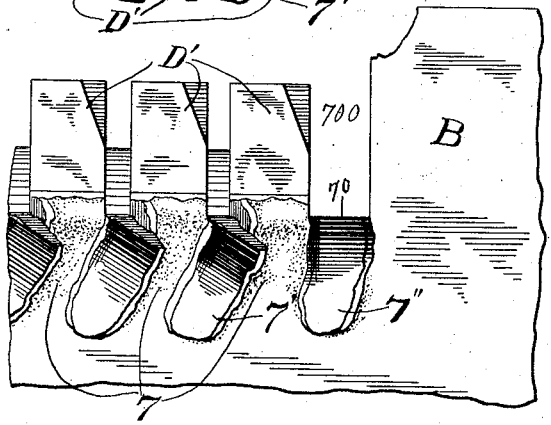
Figure 16:
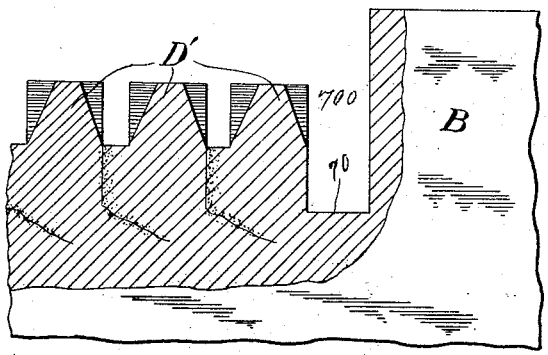

In the drawings accompanying this specification, Figure 1 and Fig. 2 are, respectively, a plan and side elevation representing a typebar made according to my present invention and between the consecutive types of which there is no raised formation provided. Fig. 3 is a side elevation of a portion of a blank and a die-carrier or wheel and shows a blank-feeding wedge and its coöperating element, the dies being adapted to produce, and the closely associated types having, in this figure and the figures up to and including 16, an intermediate raised formation. Fig. 4 is a face view of the die-wheel shown in Fig. 3 with the blank and working-die shown in section (the feeding wedge is omitted in this figure and the figure indicates, also, a mounting for the blank susceptible of being oscillated, whereby an oscillatory movement may be imparted to the blank). Fig. 5 is a side elevation of a portion of a blank showing a portion of its edge provided with types and illustrates in section the action of the die in forming a type, the scale in this figure and the following two figures being considerably larger than the scale to which Figs. 1 and 2 are drawn. Figs. 6 and 7 are partly elevational and partly sectional views representing the relative position of the die and the blank during the type-forming operation, the former figure showing the relative position of the blank and the die at the beginning of this operation and the latter figure the corresponding position at the close. Figs. 8, 9 and 10 each represent a portion of the edge of a blank provided with a finished type and shows the relation between the die and the blank, both being shown partly in section and partly in elevation, at certain stages during the production of a type on the section of the edge adjacent to the completed type; Figs. 8 and 10 illustrate, respectively, the commencement and completion of the operation, and Fig. 9 an intermediate stage; these figures are drawn upon a greatly enlarged scale as compared with actual dimensions for the purpose of more clearly illustrating the operation. Figs. 11 and 12 are, respectively, plan and elevational views drawn to the same scale as Figs. 8, 9 and 10, illustrating a portion of a blank provided with types and represent the type-formed portion of the blank as it exists prior to the trimming of the surplus material forced beyond the sides of the blank during the production of the types. Fig. 13 is partly a sectional and partly an elevational view on the same scale as the other figures on that sheet, the plane of the section being the median longitudinal vertical plane of the blank as represented in Fig. 12, this figure representing a type in a finished condition above the typographic level of the typebar. Figs. 14, 15 and 16 are views similar to Figs. 11, 12 and 13, respectively, and drawn to the same scale, but illustrate a type having a supporting column or block connecting with the body or stock of the blank, which is narrower than the corresponding feature represented in the latter figures, the type here indicated requiring a different amount of work on the part of the die for its formation, that is, the type is brought to a finished condition at a different depth in the blank than the type indicated in Figs. 11, 12 and 13; the form of die operating to work the edge of the blank into the form and appearance indicated in a general way in Figs. 8 to 16, inclusive, is represented in Fig. 3 and certain other figures of those already described. Figs. 17 and 18 are views similar to Figs. 11 and 12, respectively, and drawn upon the same scale, but show types which are formed by dies operating to produce a somewhat different formation between the consecutive types than is set forth in Figs. 11 and 12, the intermediate formation being in this instance like that represented in Figs. 1 and 2. Fig. 19 is a vertical, longitudinal, median section of the blank as indicated in Fig. 18 and on the same scale as that to which that figure is drawn. Figs. 20, 21 and 22 are views upon the same scale as that to which Figs. 5, 6 and 7 are drawn and represent a die adapted to produce a type and a formation between consecutive types similar to that indicated in Figs. 17, 18 and 19. Fig. 23, is a plan upon a somewhat smaller scale than that to which Figs. 5, 6 and 7 are drawn and represents a portion of a typebar-blank provided with a number of finished types and sets forth in a conventional way a pair of cutting instruments designed for the trimming of the blank or bar made therefrom to remove surplus material from the sides thereof.

Similar characters of reference designate corresponding parts in all the figures of the drawings.

In carrying out my present improvements, the type, it may be stated in a general way, results from the operation of a suitable type-forming die upon a blank forced one against the other to cause the penetration of the latter by the die. The blank designated in a general way throughout the present specification and drawings by B may be of any material suitable for the purpose, as, for instance, type-metal of appropriate composition, brought into the requisite or desired shape in some suitable way as by casting, rolling or otherwise. I have found, however, that a process for so operating upon the material as to produce a substantially wrought blank as distinguished from a condition resulting from the casting of the same to shape, or at least a blank having that portion of those portions wrought which are concerned in the formation of the several type-blocks, is best suited to the carrying out of the present improvements. Moreover, the blank upon which types are to be formed may be a continuous ribbon or rod, or it may be in the form of a separate piece of a length equal, approximately, to the length of the finished typebar.

In effecting the penetration of the material of the blank by the die it is immaterial whether the movement, which I may designate as a transverse feeding movement, is imparted to the blank or die or to both, but I find it convenient to feed the blank against the die and have represented in a general way in Fig. 3 a feed element for imparting such transverse movement to the blank for the purposes of the present description. The particular element there set forth consists of a wedge $w$, shifted to and fro by suitable means, and upon which the blank B is supported and which coöperates with an incline $w^2$ to raise or lower the blank. This rectilinear movement of the blank and die toward each other is not the only movement utilized in carrying out my present invention for facilitating the filling of the die cavity for disposing of the excess or surplus material separated or sheared from the type-block during the type-formation, and for producing a compact and condensed condition of the various surfaces, but in combination with this movement there is a subsidiary motion imparted to one or both members which operates to produce a type gradually and by a series of reductions and to accomplish a coincident working-out of the excess material.

In forming a type upon a blank at such a distance from an already formed and finished type as required by ordinary composition, the tendency of the formative stresses of the advancing die and the excess material removed from the blank is to distort and displace the latter type, a result invariably ensuing unless measures are taken to control the movement of such material and to lessen or control the effects of the formative stresses of the die and those which the flowage of material tends to cause. This subsidiary movement, adverted to, operates in conjunction with the aforesaid transverse feeding movement to force the excess material away from the adjacent type, that is, crosswise or laterally of the blank, and for further protecting the already formed type, I preferably use a wall or plate adapted to enter into the comparatively narrow space between the finished type and the material under the working die where it is located during the type-forming operation, serving as a retaining surface against which the moving material or flowage is received and by which its motion is directed. Such wall, it is evident so far as the purposes it fulfils are concerned, may be separate from the die and operated independently thereof, but I find it convenient to attach it to the die and operate the two as a unit. The foregoing subsidiary movement operating to gradually form the type and work the excess material outward transversely or crosswise of the blank preferably reverses in direction alternately, for the reason that such alternating motion is convenient of attainment and is better adapted to produce a symmetrically formed type. In other words, a relative to and fro motion is imparted to the members, the die and the blank, during the period of type-formation, and for the production of this relative motion I find it convenient to oscillate the blank by imparting a motion to a suitable work-holder in which the blank is supported. Good results are attained in the character of the types produced by making this oscillatory motion take place about a fixed axis, although the present invention is by no means limited in its scope to an oscillation about a fixed axis, as the oscillation may be of a different nature. I have represented in Fig. 4 in a conventional way a portion of a holder designated in a general way by H, having a slot $h$ in which the blank B is supported, and through which it is adapted to move under the action of the before mentioned wedge $w$ (which, with its coöperating incline $w^2$ is not shown in this figure). This holder H is adapted to be oscillated by some suitable means about an axis in line with the direction of length of the blank, defined, for instance, by a supporting shaft or stud indicated in a general way by the circle $h^2$. The limits of the oscillatory movement of the holder H are also indicated in a general way in this figure by the dotted lines $x, x$. The best position for this oscillatory axis, as demonstrated by the quality of types produced, appears to be just within or immediately adjacent to what will form the impression surface of the finished type. The duration, rapidity, extent, etc., of these two movements, that is, the transverse feeding movement and the oscillatory movement, and the relation of these various characteristics to each other, as well as the relation of the two specified movements one to the other, may be varied in any desired manner. The duration of the oscillatory movement may be embraced, for instance, within the limits of the period during which the members are fed toward and against each other, but preferably the oscillation will cease just before the feeding movement terminates. Furthermore, both movements may be uniform throughout their whole duration, or either may be varied, or they may both be varied. With respect to an appropriate inter-relation, I have found good results to follow from the gradual reduction in speed of the transverse feeding movement during the later portion of such movement accompanied by a concurrent oscillatory motion also decreasing in amplitude of vibration during the later stages of the feeding movement, ceasing altogether just prior to the termination of the feeding movement.

The flowage induced by the type-formative stresses of the working die naturally takes place along the line of least resistance, and these stresses themselves have a detrimental effect, as already adverted to, upon a finished type within the flowage radius of the forming type, for such sphere of disturbance extends ordinarily some distance beyond the narrow space existing between the letters of a word as words are ordinarily composed, and spaced. Even though the wall is provided at the side of the die for the protection of a formed type, considerable pressure is exerted thereon by the metal under the compression of the working-die, and as this wall must be comparatively thin owing to the comparative narrowness of the space into which it is fed, it is liable to spring and ineffectually confine the metal endwise of the blank. Furthermore, the formative stresses are liable to be transmitted under its lower edge, while if, in the attempt to preclude this, the wall is made comparatively deep, measured in line with the depth of the blank, and is advanced into the edge of the latter to reach beyond the flowage radius, since the wall must have some width, however small that may be, and the blank manifestly opposing some resistance to penetration, there arise stresses of greater or less magnitude tending to produce a distortion of a formed type or type face. As before pointed out, moreover, some of the types used in the typographic art are more readily formed than others, that is, are produced in a given mode of die-action by a less amount of work on the part of the forming die with the type finished and the cavity of the die completely filled before the die has advanced into the blank to that extent which is necessary to form other types. Upon the further advancement of the die of this early finished type, the type body within the cavity must be carried bodily downward, creating a tendency to greater stresses in the material extending to greater distances than those due or incident to the formative action of the die during the process of forming a type. Hence, though a type may be produced without disturbing an adjacent type, upon the attempt to sink the former type to the general level of the types on the bar, there may result the distortion of a finished type face or faces. If the type-forming movement is continued during the depression of the finished type-body, which will, in general, be the case, this continued movement also tends to work away or otherwise wear the impression face of the type. In any organized system, therefore, of forming a satisfactory series of types consecutively along the edge of a blank where individual type-blocks are not preliminarily treated to correspond to the particular types to be formed therefrom and the various steps and motions incident to or required in the typeforming process are not adapted to the individual types, some provision or mode of operation must exist for nullifying the distorting tendencies of those dies which complete their types above the common level of the types in the finished typebar.

One of the main features characterizing the present invention is the inducement of flowage along a predetermined and pre-formed path or surface of least resistance, whereby the formative and other stresses, in so far as they are concerned in building up and positioning a type-block surmounted by a finished face, occasions a movement along a path predetermined in position and interposing between the mass under the working die and the adjacent type an element of protection for the latter.

The type-forming instrumentalities or dies used in carrying the present improvements into effect are of suitable form and construction, and for the purpose of reference herein, are designated in a general way by D. These dies D are, as represented in the drawings attached to the present specification, adapted for the formation of a type-block or column, designated generally by D', connected integrally with the stock of the blank B and surmounted by the impression face of the type (for so I may term the upper surface of the block of the requisite contour to yield ultimately the configuration of the desired printed character).

The several dies D may be adjusted and brought into proper relation to the blank B, supported in the holder H by hand, or by mechanism, or by any other means operated or operating in any manner to attain the requisite sequence in the type composition. The dies, as an instance of a device for their convenient manipulation, may be mounted upon the periphery of a die-carrier, shown in the form of a wheel or disk and designated in a general way by X (see Figs. 3 and 4) whose shaft C is rotatably mounted upon an appropriate supporting carrier (not shown) which, as indicated in Fig. 4, may be a rotary carrier rotatable about an axis (not shown). The progressive movement of this die-wheel X, as a selected die D thereon is brought into juxtaposition to the edge of the blank, is indicated in a diagrammatic way by the dotted circle and arcs, with the die represented in dotted outline (Fig. 4) from which it is apparent that, assuming the various parts to be as above set forth, the die moves along a path which is of the nature of a cycloid. In Figs. 5 to 20 the die is shown provided with a shank 2, which is adapted to fit into a corresponding socket in the die-wheel X, by which means the die may be secured to the latter. It may be here stated that it is while the die is in contact with the blank that the transverse feeding movement and oscillation of the blank takes place.

The previously-mentioned retaining wall operating to confine the movement of the material endwise of the blank is, as set forth in the drawings accompanying the present specification, made integral with the die, that is, this wall and the die are made as a single operative tool, the wall being designated in Figs. 3 to 10, inclusive, and Fig. 13 by 3' and Figs. 19 to 22, inclusive, by 3".

Now the action to which the material of the blank under the die is subjected as a result of the oscillatory movement herein described when the blank is under the compression of the die may be described as a rolling action. As the die advances into the material of the blank and the latter is oscillated from side to side, more and more of the material is forced into the die cavity and subjected to the forging and swaging action of walls and faces of the cavity. More and more of the material necessary to build up and form the type-block, as the edges at the outer portion of the die alternately bite afresh into the blank, is forced or squeezed upward into the die under the impact and pressure of the interior surfaces of the die as the relative inclination of these surfaces and the surfaces of the mass changes and by reason of the oscillatory movement the material is forged and wrought to form while the faces at the bottom of the die cavity serve to swage the upper portion to shape. In other words, the action to which the material is subjected is one effecting a gradual reduction thereof, operating to compact the material of the type body and render the surfaces smooth and unbroken and to connect them one with the other in a manner precisely conforming to the bounding edges between the corresponding counter-faces of the die. Moreover, the forging operation results in strengthening the integral connection of the block, with the stock of the blank. During the oscillatory movement, also, extending first on one side and then on the other, an outlet is created, by reason of the slight separation of the material from the faces of the die through which air confined in the latter may escape and oil, grease, and other foreign matter be squeezed out, thus assisting in the production of an exact counter-part of the type-forming die.

I find it convenient to remove that portion of the edge of the blank on opposite sides of the type-block and under the working die, and as also the material which lies between the mass undergoing the forging operation and a contiguous type concurrently with the forming of the type-block and I utilize for this purpose the oscillatory motion of the die to gradually work such material outward laterally of the blank. The crosswise movement of this material is effectively accomplished by presenting to the material at such points where movement or flow is required; that is, at the sides of the die and in the space between the finished or continuous type and what will ultimately be the next type, a relatively-fixed surface or surfaces, which by pressure works the material under it outwardly by pressing on the same. Such surfaces, it is manifest, may be independent of the die, but for the sake of convenience they may be connected therewith, and may be, in fact, formed by the surfaces of integral extensions of the die body. They are here so represented, (see particularly 4' in Fig. 4 and 4² in Figs. 20 and 22), the lower edge of the retaining wall, 3', 3", already mentioned as serving to confine the material endwise of the blank, being also utilized for displacing the material between the finished type and the typeblock under process of formation. The action to which this excess material is subjected and which operates to effect this movement crosswise of the blank, that is, in a direction in which it will not interfere with a finished type, may evidently be described as a rolling one resulting in the rolling toward the sides of the blank of the excess and superabundant material. To facilitate this operation the various parts referred to may be somewhat curved, as shown in the present drawings.

While in actual practice the various operations to which the material is subjected include those of forging, swaging and rolling, as set forth above, they are carried on upon a somewhat minute scale (the amplitude of oscillation being designedly insufficient in extent to effect any detrimental alteration in the strength of the material) and the quantities of material subjected to these operations likewise comparatively small, yet, in so far as respects the character of the operations and the nature of the results produced, they seem entirely analogous, if not identical with operations of a kindred sort conducted upon a much larger scale. The operations incident to the carrying out of my present invention, although differing in degree from the usually accepted definitions of such terms as "forging", "swaging", "rolling" etc., appear to be the same in kind whether such operations are performed on massy material or upon the edge of a typebar-blank.

The direction of the aforementioned predetermined path or surface of least resistance is such as to facilitate the flowage of the metal under the rolling, swaging, forging and other operations to which it is subjected and as these operations tend to move the metal laterally outward toward the sides of the blank this path or surface extends crosswise of the latter. Such surface is also located under at least a portion of the metal subjected to the type-formative action, and I find it convenient to form successive surfaces along the blank for the consecutive types simultaneously with the production of the types; (that is, a surface is formed each time a type is produced) of a width, however, it may here be premised insufficient to weaken the integral connection of the typeblock with the stock of the blank. This flowage path or surface is made most advantageously I find in advance of a type and by making the vertical cross space which will ultimately separate the type-block, yet to be made and completed in advance along the blank, from the type-block just finished or in process of completion sufficiently wide when first formed to enter into the field of the next type or character, that is to say, the aforesaid surface is most readily formed by making the space at the end of the last formed type wider than such space will actually be when the next consecutive type for making the next consecutive letter is formed. It is obvious from the above description that, in so far as the respective formation of the types and the said spaces is concerned, each space may be formed independently of or simultaneously with the formation of a type, and, furthermore, that these results may be attained by separate or independent tools or devices. I find it convenient, however, to effect the formation of a space simultaneously with the formation of a type and by a tool connected to the type-forming die, and have shown in the various figures a space-forming die in the form of a plate designated in a general way by 5, on that side of the die nearest the unoperated-upon portion of the edge of the blank, and which is thicker than the described retaining wall. Evidently now when a selected die is brought over the blank to form a type the retaining wall, whose thickness determines the width of the space between the type-blocks, will not fill the slot made by the plate 5 but will leave a space, which space will be filled by the backward shifting of the material of the type-block until such movement lengthwise of the blank is arrested by the retaining wall and the surface previously made by the lower edge of the plate, and exposed at the edges of this wall.

Referring now to Figs. 8 to 16, inclusive, which illustrate the present method of forming consecutive composed types, involving the inducement of flowage along a predetermined path or surface, these figures are drawn upon a very considerably enlarged scale to magnify the various operations taking place and more clearly set forth the steps involved. D in some of these figures indicates, as before, a type-forming die in operative position over the blank B, and D' a finished type-block. As shown in these figures, the lower edge of the retaining wall at the side of the die cavity and integrally connected with the die is provided with a recess (see s) the purpose of which will be referred to presently. The plate 5 is also shown integral with the die and the extensions of both the retaining wall and the plate at the sides of each mentioned surface 4², 4² and forming virtually a part thereof, may project somewhat below these surfaces, if desired, as indicated in Figs. 20, 21 and 22, for instance, to further depress the portions of the blank under them.

In all the elevational views the excess material rolled toward the side of the blank and away from the type-blocks D' is represented by stippling and designated by 7, while in the various plan views the same portions 7 are indicated as bounded by uneven lines, the portions rolled off by the retaining wall and space-forming plate being also indicated and designated by 7' and 7" respectively. In Fig. 8 the parts are shown in a position in which the die D has just come into contact with the blank B. It will be seen in this figure that there exists a space between the inner face of the retaining wall and the vertical face of the wall E, formed by the space-forming plate 5 of the die which wrought the adjoining type into shape by reason of the rolling of the material which previously occupied the space sidewise of the blank, the material forced or caused to flow therefrom by the plates being indicated by 7". As the die sinks into the blank and the material is subjected to the forging and rolling action of the die faces and the rolling action of the faces 4², 4², the material in the die cavity cants over shifting endwise of the blank toward the adjacent finished type-block at the rear until those portions adjacent to the bottom of the die-cavity are restrained from further endwise movement by the retaining wall, while the mass moves bodily more and more lengthwise to overlap the surface at the bottom of the space, as indicated by E' (see Fig. 9). Ultimately the mass beds upon this surface, as shown in Fig. 10, across which surface and laterally of the blank the material as it is subjected to the pressure of the working die may move more readily than in any other direction. The relative direction of the surface measured transversely to its line of length across the blank changes somewhat owing to the pressure of the superincumbent mass, assuming a direction eventually somewhat like that indicated in Fig. 10. During the type-forming operation as indicated in Figs. 8, 9 and 10 the space-forming plate connected to the die is simultaneously preparing the surface along which flowage of material may take place during the formation of the next type, and in general the width of this surface measured lengthwise of the blank will be determined by the width of the plate and such width is in practice made sufficient to decrease the resistance to flowage exerted by the mass to adequately protect the adjacent finished type-block, although not enough to weaken the connection of the type-block with the stock of the blank to a degree which would render it incapable of resisting the crushing stresses to which it will afterward be subjected when in use. As the edge of the space-forming plate 5 works out the material under it by an operation similar to the rolling operation already described; the lower edge of this plate may also be curved, as shown. Stresses in the mass cause a movement which follows this path or surface of least resistance in preference to developing deforming strains in the metal of the adjacent type-block.

In Fig. 13, which shows two adjacent types and a portion of a third, various relative distances, measured in the direction of the length of the blank, are set forth for the purpose of comparison. In this figure the line 10 indicates the distance across the die cavity from face to face thereof, that is, the distance from the inner face of the space-forming plate to the inner face of the retaining wall; the line 11 the distance from the outer face of this plate to the outer face of the wall; and the line 12 representing the distance from the inner face of the retaining wall to the outer face of the plate by comparison with line 13, representing the distance from the inner face of the retaining wall to the farther face of the space which will ultimately separate the type-block from the next succeeding type-block surface, serves to show the lapping or extension of the plate occurring during the type-forming operation into the field of the next type. This figure also serves to exhibit an important practical advantage resulting from the existence of a surface along which flowage can take place most readily. The type-block D' under the working die D is represented as having its upper surface above the impression surface of the finished types at the side, the level of which latter represents the common level of the types in a finished typebar, and in this position the type-block is assumed to have been completely formed and to require no further formative action of the die, to finish its faces. This representation is typical of actual conditions, since some types are completely formed nearer the top of the blank than others and require to be moved bodily downward to bring them in line with types which are not finished until the forming die has reached a greater depth in the blank. In the absence of any convenient path for the movement of the material, as the die continues to work and advance into the blank, the tendency is to disintegrate and distort the completed type within the cavity of the die, and unless the resistance to flowage is reduced the mass in the die cavity will assume some other condition than that of a satisfactory type. If, however, such resistance is reduced to a minimum by the existence of a surface which is provided by this invention over which the flowage can take place with comparative ease, the type can be carried downward to a comparatively great depth without injury. Figs. 14, 15 and 16 set forth a type face adapted to be formed upon a narrower type-block than is required for the type face illustrated in Fig. 11, the type represented in the former figures being brought to a finished condition at a different depth than the type indicated in the latter figure.

In some cases, and especially in the production of a matrix for stereotypic forms, it is desirable that the space between successive types shall be comparatively shallow to eliminate or lessen the tendency of the material of the matrix to stick and wedge therein. Such reduced depth, in carrying out the present invention, may be brought about by providing the bottom edge of the retaining wall with the recess $s$ as already adverted to. This recess is here represented as of curved outline resulting in a convex archlike, formation (see $s'$ in Figs. 11, 12 and 13) built up from material flowing through the recess from under the die until arrested in its movement by the face of the adjacent type-block and forming an integral part with the type-block under the working die. Each type-block is then supported against its adjoining block along the vertical plane of contact between its integral extension and the adjacent block, which latter is in turn supported by its adjoining block at the rear, and so on, the various type-blocks being supported as well along the preformed surfaces or paths of least resistance. The support afforded during the formation of the successive type-blocks and afterward is thus an additive one, resulting in a unified and integral structure.

A type-forming die $D$ is shown in some of the figures in operative position over the blank $B$ and the space-forming die or plate 5 is also shown integral with the die. The extensions of both the retaining wall and the plate at the sides of each of the mentioned surfaces $4'$, $4'$ of the extensions of the die body and forming virtually a part thereof, may project somewhat below the surface of these latter extensions, if desired, and as here indicated, to further depress the portion of the blank under them.

In most of the elevational views the excess material rolled from the sides of the blank and away from the type-blocks $D'$, is represented by stippling and designated by 7, while in the various plan views the same portions 7 are indicated as bounded by uneven lines, the portions rolled off by the space-forming plate or die, is also indicated being designated by $7'$. As the die sinks into the blank and the material is subjected to the forging and rolling action of the die-faces and the rolling action of the various faces the material in the die cavity cants over, shifting endwise of the blank toward the adjacent finished type-block at the rear until those portions adjacent to the bottom of the die-cavity are restrained from further endwise movement by the retaining wall while the mass moves bodily more and more lengthwise to overlap the surface 70 at the bottom of the space 700 formed by the space-forming die, ultimately bedding upon this surface, across which and laterally of the blank, the material, as it is subjected to the pressure of the working-die, may move more rapidly than in any other direction. As the edge of the space-forming die or plate 5 works out the material under it by an action or operation similar to the rolling one already described, the lower edge of this plate may also be curved as shown. Stresses in the mass, therefore, cause a movement which follows this path or surface of least resistance in preference to developing deforming strains in the material of the adjacent type-block.

The spaces between words and letters upon a type-bar, whether such spaces be of uniform width or otherwise, may be produced in any appropriate manner, but preferably they will be formed by a suitable die or dies operating to remove portions of the edge of the blank and also preferably sidewise of the latter to form spaces by a rolling action, as already described. A die proper for the purpose is indicated in Fig. 3, secured to the die-wheel X and marked $D^2$. Material forced beyond the planes of the sides of the typebar or typebar-blank by the operation of the dies may be trimmed off and removed to bring the sides of the bars in substantial parallelism by any suitable means. For instance, such a means may be as represented in Fig. 23 where a pair of cutting instruments $c$, $c$ are shown by the operation of which, through suitable mechanism, the bar may be trimmed.

My present improvements as set forth in the present specification, results in the production of a typebar having thereon wrought types of a superior character, of a relatively great height at the sides adjacent to the sides of the blank and a relatively low height at points midway of the types, measured crosswise of the bar, while the bottom surfaces of the intermediate spaces are smoothly rounded upward along the median line of the bar. The releasing of the small amount of metal required to form curved intermediate surfaces between the types, has the peculiar effect of somewhat prolonging the period of activity in the mass of metal which forms the upper portion of the type being made. It is believed that the prolongation of this activity in such a manner as to continue the duration of motion throughout the period consumed in forming the major portion of the type-body or block, is an important aid in the production of a high quality of product with a minimum requirement as to time, precision of mechanism, etc.

Having thus described my invention, I claim:

1. That improvement in the art of making types and type-bars which consists in providing a space, and at the bottom of the space a prepared path for the outward flowage of the material, and in working the material and subjecting the material to flowage, and compelling the material of flowage to move into said space and outward upon and along such predetermined path.

2. That improvement in the art of making types and typebars which consists in providing a space, and at the bottom of the space a prepared path for the outward flowage of the material, and in working the material, by the repeated movements of a single die, and subjecting the material to flowage, and compelling the material of flowage to move into said space and outward upon and along such predetermined path under the continued movement of the die.

3. That improvement in the art of making types and type-bars which consists in providing a space, and at the bottom of the space a prepared path for the outward flowage of the material, and in working the material and subjecting the material to flowage, and compelling the material of flowage to move into said space and outward upon and along such predetermined path, and during the typeforming operation bringing material over and in contact with the surface formed by such outward flowage of material.

4. That improvement in the art of making types and typebars which consists in providing a space, and at the bottom of the space a prepared path for the outward flowage of the material, and in working the material, by the repeated movements of a single die, and subjecting the material to flowage, and compelling the material of flowage to move into said space and outward upon and along such predetermined path under the continued movement of the die, and during the typeforming operation bringing material over and in contact with the surface formed by such outward flowage of material.

5. That improvement in the art of making typebars which consists in shaping a portion of the edge of a typebar-blank into a type and shifting the position of such portion lengthwise of the blank.

6. That improvement in the art of making typebars which consists in subjecting opposite sides of a portion of the edge of a typebar-blank to a forging operation; compressing the face of such blank in contact with a die; and shifting such portion lengthwise of the blank.

7. That improvement in the art of making typebars which consists in shaping a portion of the edge of a typebar-blank into a type, and shifting such type lengthwise of the blank beyond the normal position of such portion.

8. That improvement in the art of making typebars which consists in shaping a portion of the edge of a typebar-blank into a type, and simultaneously shifting such portion lengthwise of the blank.

9. That improvement in the art of making typebars which consists in compressing a portion of the edge of a typebar-blank in contact with a type-die, and shifting such portion lengthwise of the blank.

10. That improvement in the art of making typebars which consists in confining endwise of a blank a portion of the edge thereof: compressing such confined portion in contact with a type-die; and shifting said portion lengthwise of the blank.

11. That improvement in the art of making typebars which consists in confining lengthwise of a blank between two separated lines a portion of the edge of a blank in contact with a type-die, and shifting said portion lengthwise of the blank between said lines.

12. That improvement in the art of making typebars which consists in simultaneously compressing a portion of the edge of a blank in contact with a type-die, and shifting the position of such portion lengthwise of the blank.

13. That improvement in the art of making typebars which consists in rolling a portion of the edge of a typebar-blank in contact with a type-die, and shifting such portion lengthwise of the blank.

14. That improvement in the art of making typebars which consists in rolling a portion of the edge of a typebar-blank crosswise of the blank while in contact with a type-die, and shifting such portion lengthwise of the blank.

15. That improvement in the art of making typebars which consists in shaping a portion of the edge of a blank into a type, and shifting such portion rearward along the blank.

16. That improvement in the art of making typebars which consists in subjecting portions of the edge of a typebar-blank to compression in contact with type-dies and thereby forming types and overlapping the successive type-blocks.

17. That improvement in the art of making typebars which consists in subjecting portions of the edge of a typebar-blank to compression in contact with type-dies, and thereby forming types and overlapping the blocks of said types during the formation thereof.

18. That improvement in the art of making typebars which consists in rolling portions of the edge of a typebar-blank in contact with type-dies and thereby forming types and overlapping the blocks of said types during the formation thereof.

19. That improvement in the art of making typebars which consists in rolling in contact with a type-die a portion of the edge of a typebar-blank of less width than the die space and simultaneously spreading out such said portion lengthwise of the blank and filling the die-space.

20. That improvement in the art of making a line of type which consists in successively subjecting successive portions of the edge of the blank to a working to thereby form at each working a type and concurrently with each working cause the backward shifting of the forming type.

21. That improvement in the art of making a line of type which consists in successively subjecting successive portions of the edge of a blank to a working movement extending transversely to the line of length of the blank, to thereby form at each working a type and concurrently with each working cause the backward shifting of the forming type.

22. That improvement in the art of making a line of type which consists in successively subjecting successive portions of the edge of a blank to a working movement extending transversely to the line of length of the blank and decreasing in amount as the type nears completion, to thereby form at each working a type and concurrently with each working cause the backward shifting of the forming type.

23. That improvement in the art of making types and typebars, which consists in working by a crosswise to and fro action the material at each of a successive series of positions and subjecting the same to an outward flowage along and upon a prepared path of least resistance.

24. That improvement in the art of making types and typebars, which consists in subjecting each type formative portion of the blank to a crosswise to and fro rolling, and working the material outward toward and upon a low resistance path.

25. That improvement in the art of making typebars, which consists in working a portion of the edge of the typebar blank by crosswise to and fro rolling and inducing flowage upon and along a low resistance path of the material of the blank during said crosswise rolling.

26. That improvement in the art of making typebars, which consists in confining lengthwise of a blank between two separated lines and portions of the edge of a blank in contact with a type die and by said die shifting said portion lengthwise of the blank between said lines.

27. That improvement in the art of making typebars, which consists in shaping a portion of the edge of a blank into a type and by the die shifting such portion rearward along the blank.

28. That improvement in the art of making typebars which consists in subjecting successive portions of the edge of a typebar blank to compression in contact with a suitable type die, thereby forming types, and overlapping the successive type blanks.

29. That improvement in the art of making a typebar which consists in successively subjecting successive portions of the edge of a blank to a working in conjunction with a suitable type die thereby forming a type at each of the successive stations, and overlapping such type with an adjacent type block.

30. That improvement in the art of making typebars which consists in forming type upon a blank and concurrently shifting the same over a new base on said blank.

31. That improvement in the typographic art which consists in confining endwise of a blank a portion of the edge thereof, applying a die to such confined portion and thereby shifting the same upon a blank.

32. That improvement in the art of making typebars which consists in shaping a portion of the edge of a blank into a type and shifting such portion along the blank to a new position thereon.

33. That improvement in the art of making typebars which consists in rolling a portion of the edge of a typebar blank while in contact with a type die and shifting such portion in a direction transverse to the plane of rolling.

34. That improvement in the art of making types and typebars which consists in working by a crosswise to and fro action the material at each of a successive series of positions and subjecting the same to an outward flowage upon and along a path of least resistance prepared for each position.

35. That improvement in the art of making a line of type which consists in forming the types in succession on the edge of a blank, and in shifting the material of each forming type rearwardly of the blank.

36. That improvement in the art of making typebars which consists in forming types on the edge of the typebar blank and shifting simultaneously with the forming of each type the stock thereof rearwardly of the blank a uniform distance.

37. That improvement in the art of making types and typebars which consists in subjecting the material to flowage longitudinally to form an extension of the type and laterally to work the material outward along a predetermined path.

38. That improvement in the art of making types and typebars which consists in subjecting material to flowage longitudinally to form an extension of the type and laterally to work material outward by a rolling operation along a predetermined path.

39. That improvement in the art of making types and typebars which consists in subjecting material to flowage longitudinally to form an extension of the type and laterally to work material outward by a forging, swaging, and rolling operation along a predetermined path.

40. That improvement in the art of making types and typebars which consists in subjecting material to flowage longitudinally to form an extension of the type and laterally to work material outward by a forging and rolling operation along a predetermined path.

41. That improvement in the art of making types and typebars which consists in subjecting material to flowage longitudinally to form an extension of the type and laterally to work material outward along a predetermined path and in the type forming operation bringing material over and in contact with a surface formed by such outward flowage of material.

42. That improvement in the art of making types and typebars which consists in subjecting material to flowage longitudinally to form an extension of the type and laterally to work material outward by a rolling operation along a predetermined path and in the type forming operation bringing material over and in contact with a surface formed by such outward flowage of material.

43. That improvement in the art of making types and typebars which consists in subjecting material to flowage longitudinally to form an extension of the type and laterally to work material outward by a forging and rolling operation along a predetermined path and in the type forming operation bringing material over and in contact with a surface formed by such outward flowage of material.

44. That improvement in the art of making types and typebars which consists in subjecting material to flowage longitudinally to form an extension of the type and laterally to work material outward by a forging, swaging, and rolling operation along a predetermined path and in the type forming operation bringing material over and in contact with a surface formed by such outward flowage of material.

45. That improvement in the art of making types and typebars which consists in shaping a portion of the edge of a typebar-blank into a type having an integral extension, and shifting the position of such portion lengthwise of the blank.

46. That improvement in the art of making types and typebars which consists in subjecting opposite sides of a portion of a typebar-blank to a forging operation, compressing the face of such blank in contact with a die and a retaining wall having a depression, and shifting such portion lengthwise of the blank to form an extension of the type.

47. That improvement in the art of making types and typebars which consists in shaping a portion of the edge of a typebar-blank into a type having an integral extension and shifting such type and extension lengthwise of the blank beyond the normal position of such portion.

48. That improvement in the art of making types and typebars which consists in shaping a portion of the edge of a typebar-blank into a type having an integral extension and simultaneously shifting such type and extension lengthwise of the blank beyond the normal position of such portion.

49. That improvement in the art of making types and typebars which consists in compressing a portion of the edge of a typebar-blank in contact with a type-die, and a retaining wall having a depression, and shifting such portion lengthwise of the blank.

50. That improvement in the art of making types and typebars which consists in confining endwise of a blank a portion of the edge thereof, compressing such confined portion in contact with a type-die and retaining wall having a depression and shifting said portion lengthwise of the blank.

51. That improvement in the art of making types and typebars which consists in confining endwise of a blank between two separated lines a portion of the edge thereof, compressing such confined portion in contact with a type-die and a retaining wall having a depression and shifting said portion lengthwise of the blank.

52. That improvement in the art of making types and typebars which consists in simultaneously compressing a portion of the edge of a blank in contact with a type-die and a retaining wall having a depression and shifting the position of such portion lengthwise of the blank.

53. That improvement in the art of making types and typebars which consists in rolling a portion of the edge of a typebar blank in contact with a type-die and retaining wall having a depression, and shifting such portion lengthwise of the blank.

54. That improvement in the art of making types and typebars which consists in rolling a portion of the edge of the typebar-blank crosswise of the blank while in contact with a type-die and a retaining wall having a depression, and shifting such portion lengthwise of the blank.

55. That improvement in the art of making types and typebars which consists in shaping a portion of the edge of a blank into a type having an integral extension and shifting such portion rearward along the blank.

56. That improvement in the art of making types and typebars which consists in subjecting portions of the edge of a typebar-blank to compression in contact with type-dies having side walls provided with depressions and thereby forming types and overlapping the successive type-blocks.

57. That improvement in the art of making types and typebars which consists in subjecting portions of the edge of a typebar-blank to compression in contact with type-dies having side walls provided with depressions and thereby forming types and overlapping the successive type-blocks, during the formation thereof.

58. That improvement in the art of making types and typebars which consists in rolling portions of the edge of a typebar-blank in contact with type-dies having side walls, provided with depressions, and thereby forming types with integral extensions and overlapping the blocks and extensions during the formation thereof.

59. That improvement in the art of making types and typebars which consists in rolling in contact with a type-die a portion of the edge of a typebar-blank of less width than the die space and simultaneously spreading out said portion lengthwise of the blank and filling the die space and a space rearward of the die to form a type having an extension.

60. That improvement in the art of making types and typebars which consists in compressing a portion of the edge of a typebar-blank in contact with a combined type and space-forming die having an extension-forming depression and thereby forming a type and a space and an integral type-block extension.

61. That improvement in the art of making types and typebars which consists in compressing a portion of the edge of a typebar-blank in contact with a die having a type-forming member and an extension-forming member to the rear thereof and a space-forming member disposed in advance thereof and thereby forming a type and an integral extension thereof and a space.

62. That improvement in the art of making types and typebars which consists in compressing a portion of the edge of a typebar-blank in contact with a die having a type-forming member and space-forming members at the opposite sides thereof, one of said members having a depression and thereby forming a type and spaces at the sides of the type and an integral extension to the rear of the type-block.

63. That improvement in the art of making types and typebars which consists in first forming on the edge of a typebar-blank a type and a space in advance thereof and then forming a second type in advance of such space and partially filling the latter to form a type-block and an integral extension of the block.

64. That improvement in the art of making types and typebars which consists in first forming on the edge of a typebar-blank a type and a space in advance thereof and then subjecting a succeeding portion of the edge of such blank to the compressing action of a combined type and space-forming die and spreading out the stock rearward of the blank and partially filling the previous formed space and thereby forming in advance of the first type-block, a second type-block having an integral extension extending to and contacting with the type-block of the first formed type.

65. That improvement in the art of making a line of type, which consists in successively subjecting successive portions of the edge of a blank to a working to thereby form at each working a type having an integral extension located in the space between the type so formed and the immediately adjacent previously formed type.

66. That improvement in the art of making a line of type, which consists in successively subjecting successive portions of the edge of a blank to the operation of individual type dies each having at one side a space-forming die and at the other side a retaining wall adapted to control the form of the space between the adjacent types.

67. That improvement in the art of making types and typebars, which consists in subjecting the material to longitudinal flowage to form a rearward longitudinal extension of the type for engaging the preceding type, and to lateral flowage to work the material transversely outward.

68. That improvement in the art of making types and typebars, which consists in subjecting the material to longitudinal flowage to form a longitudinal extension of the type and to lateral flowage to induce the material to move laterally outward upon and along a preformed path.

69. That improvement in the art of making types and typebars, which consists in shaping a portion into a type having an integral extension and shifting such portion rearwardly along the said blank and forging it into position.

70. That improvement in the art of making types and typebars, which consists in shaping each type with an integral longitudinal extension and shifting such portion rearwardly longitudinally along the said blank to its final position thereon.

71. That improvement in the art of making types and typebars, which consists in producing a flowage path for excess material and then subjecting the material to longitudinal flowage to form a longitudinal extension of the type and to lateral flowage to induce the material to move laterally outwardly along the said preformed path.

72. That improvement in the art of making types and typebars which consists in first forming on the edge of a typebar-blank a type and a space in advance thereof and then forming a second type in advance of such space and concurrently forming a spacer in said space and between said first and second types.

73. That improvement in the art of making types which consists in subjecting a type forming mass of metal to a working action within a confined space and permitting the lateral escape of some of the metal from the mass being worked upon through one of said confining walls, and prolonging the period of activity in the mass of metal worked upon.

74. That improvement in the art of making types and typebars which consists in shaping each type by a series of working movements and during such shaping confining the metal of the portion being acted upon from escape longitudinally of the bar except at one portion, and permitting rearward escape, thereby prolonging the activity of the mass of metal which is being worked upon, and concurrently shifting said mass of metal rearwardly and in the direction of the rearward escape of the metal.

75. That improvement in the art of making types and typebars which consists in shaping each type with an integral longitudinal extension and shifting such portion longitudinally along said blank in the direction of said extension and to its final position.

76. That improvement in the art of making types and typebars which consists in shaping each type with an integral rearward extension, and shifting such type rearwardly along the blank to its final position thereon.

77. That improvement in the art of making types and typebars which consists in subjecting type forming material to flowage longitudinally, forming an extension to the type by the material worked outward upon and along a predetermined path.

78. That improvement in the art of making types and typebars which consists in subjecting the material to a working action and causing flowage thereof longitudinally, forming an extension from the type of such flowage upon and along a predetermined path.

79. That improvement in the art of making types and typebars which consists in subjecting type forming material to outward flowage upon and along a predetermined path, and forming an extension of the type from such flowage.

80. That improvement in the art of making types and typebars which consists in serially forming a number of types and concurrently with the formation of each type forming a spacer portion between such type and the previously formed adjacent types.

81. That improvement in the art of making types and typebars which consists in shaping a portion into a type, forming an integral extension and shifting such portion rearwardly along the blank and into position.

82. That improvement in the art of making typebars which consists in serially forming a number of type heads on a body portion, and forming a space portion integral with each type head and above and upon the body portion for spacing such type head from an adjacent type head.

Signed at my office, Nos. 9–15 Murray street, New York, N. Y. this 11th day of February, 1907.

FRANCIS H. RICHARDS.

Witnesses:
 JOHN O. SEIFERT,
 FRED. J. DOLE.